United States Patent
Liu et al.

(10) Patent No.: US 11,361,364 B2
(45) Date of Patent: Jun. 14, 2022

(54) SHOPPING RECOMMENDATION METHOD, CLIENT, AND SERVER

(71) Applicant: BOE TECHNOLOGY GROUP CO., LTD., Beijing (CN)

(72) Inventors: Xiangyang Liu, Beijing (CN); Chune Lan, Beijing (CN); Tong Liu, Beijing (CN); Zhiguo Zhang, Beijing (CN); Hui Rao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 156 days.

(21) Appl. No.: 16/160,249

(22) Filed: Oct. 15, 2018

(65) Prior Publication Data

US 2019/0279273 A1    Sep. 12, 2019

(30) Foreign Application Priority Data

Mar. 9, 2018  (CN) .......................... 201810194909.3

(51) Int. Cl.
*G06Q 30/06*        (2012.01)
*G10L 15/22*        (2006.01)
(Continued)

(52) U.S. Cl.
CPC ........... *G06Q 30/0631* (2013.01); *G06N 3/08* (2013.01); *G06N 5/022* (2013.01); *G10L 15/16* (2013.01);
(Continued)

(58) Field of Classification Search
CPC ..... G06Q 30/0601–0643; G06Q 30/08; G06Q 30/0631; G06Q 30/06; G06N 3/08;
(Continued)

(56) References Cited

U.S. PATENT DOCUMENTS

| 8,849,791 B1* | 9/2014 | Hertschuh | .......... | G06Q 30/0617 |
| | | | | 707/713 |
| 2006/0003780 A1* | 1/2006 | Mamdani | .......... | G06Q 20/3272 |
| | | | | 455/466 |

(Continued)

FOREIGN PATENT DOCUMENTS

| CN | 102663627 A | 9/2012 |
| CN | 105139239 A | 12/2015 |

(Continued)

OTHER PUBLICATIONS

Shopmobia: An Emotion-based Shop Rating System. Nouf Alajmi, et al. 2013 Humaine Association Conference on Affective Computing and Intelligent Interaction. (Year: 2013).*

(Continued)

*Primary Examiner* — William J Allen
(74) *Attorney, Agent, or Firm* — Kinney & Lange, P.A.

(57) ABSTRACT

The present disclosure provides a shopping recommendation method, a client, and a server. The method includes: acquiring voice information of a user, and performing voice recognition and keyword extraction on the voice information, to obtain shopping keyword information; transmitting the shopping keyword information to a server, so that the server performs interest prediction according to the shopping keyword information and shopping related information of the user, to generate recommendation information; and receiving the recommendation information, and generating shopping recommendation content according to the recommendation information to be displayed by a display.

8 Claims, 8 Drawing Sheets

(51) Int. Cl.
*G10L 15/30* (2013.01)
*G06N 3/08* (2006.01)
*G06N 5/02* (2006.01)
*G10L 15/16* (2006.01)
*G10L 15/08* (2006.01)

(52) U.S. Cl.
CPC .............. *G10L 15/22* (2013.01); *G10L 15/30* (2013.01); *G10L 2015/088* (2013.01); *G10L 2015/223* (2013.01)

(58) Field of Classification Search
CPC ......... G06N 5/022; G10L 15/08; G10L 15/16; G10L 15/22; G10L 15/263; G10L 2015/088; G10L 2015/223; G10L 2015/228; G10L 15/30; G10L 15/26
See application file for complete search history.

(56) References Cited

U.S. PATENT DOCUMENTS

| | | | |
|---|---|---|---|
| 2011/0246561 A1 | 10/2011 | Eshima et al. | |
| 2017/0103440 A1* | 4/2017 | Xing | G06Q 30/0625 |
| 2018/0189857 A1* | 7/2018 | Wu | G06Q 30/0631 |
| 2018/0247363 A1* | 8/2018 | Agarwal | G06Q 30/0629 |
| 2019/0005570 A1* | 1/2019 | Goodman | G06F 16/90332 |
| 2019/0130285 A1* | 5/2019 | Snyder | G06N 3/04 |
| 2020/0090411 A1 | 3/2020 | Zhou et al. | |
| 2020/0168003 A1 | 5/2020 | Zhou et al. | |

FOREIGN PATENT DOCUMENTS

| | | |
|---|---|---|
| CN | 105260908 A | 1/2016 |
| CN | 105528374 A | 4/2016 |
| CN | 106779921 A | 5/2017 |
| CN | 106779922 A | 5/2017 |
| CN | 107316645 A | 11/2017 |
| CN | 107330115 A | 11/2017 |
| CN | 107507017 A | 12/2017 |

OTHER PUBLICATIONS

First Chinese Office Action dated May 25, 2021, for corresponding Chinese Patent Application No. 201810194909.3, 19 pages.

* cited by examiner

SHOPPING RECOMMENDATION METHOD, CLIENT, AND SERVER

CROSS-REFERENCE TO RELATED APPLICATION(S)

This application claims priority to Chinese Patent Application No. CN201810194909.3, filed on Mar. 9, 2018, which is incorporated herein by reference in its entirety.

TECHNICAL FIELD

The present disclosure relates to the field of shopping technology in a shopping mall or supermarket, and more particularly, to a shopping recommendation method, a client, and a server.

BACKGROUND

On the one hand, current shopping recommendation solutions are usually only presented in online scenes such as shopping pages etc. Generally, only unified advertisements are placed offline, and it is difficult to make reasonable personalized recommendations for users in offline scenes such as shopping in a shopping mall or supermarket, etc., to improve a purchase rate of the shopping in the shopping mall or supermarket. On the other hand, prediction and recommendation are usually performed only according to users' personal information, shopping history records, chat records of instant messaging tools, etc., and current demands of the users in an offline shopping scene cannot be accurately predicted.

SUMMARY

In a first aspect of the present disclosure, there is provided a shopping recommendation method applicable to a client, comprising:

acquiring voice information of a user, and performing voice recognition and keyword extraction on the voice information, to obtain shopping keyword information;

transmitting the shopping keyword information to a server, so that the server performs interest prediction according to the shopping keyword information and shopping related information of the user, to generate recommendation information; and receiving the recommendation information, and generating shopping recommendation content according to the recommendation information to be displayed by a display.

In an embodiment, performing the interest prediction comprises:

extracting a feature vector according to the shopping keyword information and the shopping related information;

inputting the feature vector to a deep neural network model for training and prediction to obtain a prediction result; and generating the recommendation information according to the prediction result.

In an embodiment, the method further comprises:

in a case where no voice information is acquired or no shopping keyword information is extracted, transmitting notification information to the server to notify the server to perform interest prediction according to the shopping related information of the user, to generate the recommendation information.

In an embodiment, the shopping keyword information comprises at least one of commodity category information, commodity name information, commodity rating information, and the shopping related information comprises at least one of basic information of the user, commodity information, shopping history information, and other interactive information.

In a second aspect of the present disclosure, there is provided a shopping recommendation method applicable to a server, comprising:

receiving shopping keyword information transmitted by a client, wherein the shopping keyword information is obtained by acquiring voice information of a user and performing voice recognition and keyword extraction on the voice information by the client;

performing interest prediction according to the shopping keyword information and shopping related information of the user to generate recommendation information; and transmitting the recommendation information to the client, so that the client generates shopping recommendation content according to the recommendation information to be displayed by a display.

In an embodiment, performing interest prediction according to the shopping keyword information and shopping related information of the user to generate recommendation information comprises:

extracting a feature vector according to the shopping keyword information and the shopping related information;

inputting the feature vector to a deep neural network model for training and prediction to obtain a prediction result; and generating the recommendation information according to the prediction result.

In an embodiment, the method further comprises:

receiving notification information transmitted by the client, wherein the notification information is transmitted by the client when no voice information is acquired or no shopping keyword information is extracted; and after receiving the notification information, performing interest prediction according to the shopping related information of the user, to generate the recommendation information.

In an embodiment, the shopping keyword information comprises at least one of commodity category information, commodity name information, and commodity rating information, and the shopping related information comprises at least one of basic information of the user, commodity information, shopping history information, and other interactive information.

In a third aspect of the present disclosure, there is provided a client, comprising:

one or more processors;

a memory connected to the one or more processors and having one or more programs stored therein, which, when executed by the one or more processors, cause the one or more processors to be configured to:

acquire voice information of a user, and perform voice recognition and keyword extraction on the voice information, to obtain shopping keyword information;

transmit the shopping keyword information to a server, so that the server performs interest prediction according to the shopping keyword information and shopping related information of the user, to generate recommendation information; and receive the recommendation information, and generate shopping recommendation content according to the recommendation information to be displayed by a display.

In an embodiment, performing the interest prediction comprises:

extracting a feature vector according to the shopping keyword information and the shopping related information;

inputting the feature vector to a deep neural network model for training and prediction to obtain a prediction result; and generating the recommendation information according to the prediction result.

In an embodiment, the one or more processors are further configured to:

when no voice information is acquired or no shopping keyword information is extracted, transmit notification information to the server to notify the server to perform interest prediction according to the shopping related information of the user, to generate the recommendation information.

In an embodiment, the shopping keyword information comprises at least one of commodity category information, commodity name information, commodity rating information, and the shopping related information comprises at least one of basic information of the user, commodity information, shopping history information, and other interactive information.

In a fourth aspect of the present disclosure, there is provided a server, comprising:

one or more processors;

a memory connected to the one or more processors and having one or more programs stored therein, which, when executed by the one or more processors, cause the one or more processors to be configured to:

receive shopping keyword information transmitted by a client, wherein the shopping keyword information is obtained by acquiring voice information of a user and performing voice recognition and keyword extraction on the voice information by the client;

perform interest prediction according to the shopping keyword information and shopping related information of the user to generate recommendation information; and transmit the recommendation information to the client, so that the client generates shopping recommendation content according to the recommendation information to be displayed by a display.

In an embodiment, the one or more processors are further configured to:

extract a feature vector according to the shopping keyword information and the shopping related information;

input the feature vector to a deep neural network model for training and prediction to obtain a prediction result; and generate the recommendation information according to the prediction result.

In an embodiment, the one or more processors are further configured to:

receive notification information transmitted by the client, wherein the notification information is transmitted by the client when no voice information is acquired or no shopping keyword information is extracted; and after receiving the notification information, perform interest prediction according to the shopping related information of the user, to generate the recommendation information.

In an embodiment, the shopping keyword information comprises at least one of commodity category information, commodity name information, and commodity rating information, and the shopping related information comprises at least one of basic information of the user, commodity information, shopping history information, and other interactive information.

BRIEF DESCRIPTION OF THE DRAWINGS

Other features, purposes, and advantages of the present disclosure will become more apparent from the detailed description of non-restrictive embodiments taken with reference to accompanying drawings below.

DETAILED DESCRIPTION

The present disclosure will be further described in detail below in conjunction with the accompanying drawings and embodiments. It can be understood that the specific embodiments described here are merely illustrative of the present disclosure, instead of limiting the present disclosure. It should also be illustrated that, for the convenience of description, only parts related to the present disclosure are shown in the accompanying drawings.

It should be illustrated that the embodiments in the present disclosure and features in the embodiments may be combined with each other without a conflict. The present disclosure will be described in detail below with reference to the accompanying drawings in conjunction with the embodiments.

Figure 1:
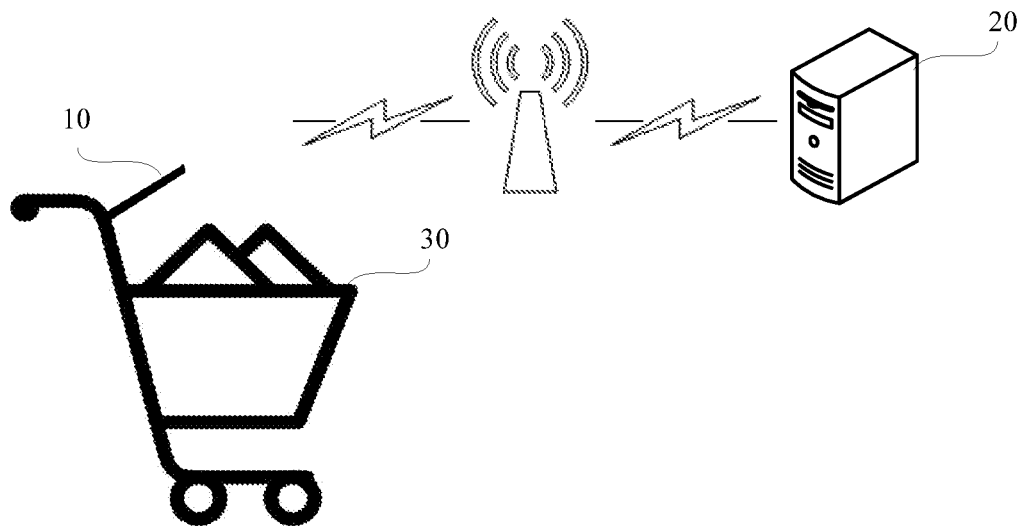
FIG. 1 is a schematic diagram of an application scenario according to an embodiment of the present disclosure.

FIG. 1 is a schematic diagram of an application scenario according to an embodiment of the present disclosure.

As shown in FIG. 1, in the present embodiment, a client 10 according to the present disclosure is configured on a shopping cart 30, and the client 10 is communicatively connected to a remote server 20 through a wireless network. In the present embodiment, the client 10 comprises a central processor, a wireless communication circuit, a voice collection circuit, and a display screen which are integrated as a whole. In other embodiments, the client 10 may also comprise only a central processor and a wireless communication circuit, and is communicatively connected to a voice collection device and a display screen which are configured separately in a wireless or wired manner. The client 10 may also be configured on various shopping auxiliary apparatuses such as a shopping basket, a navigation robot etc. to realize the same technical effect, as long as the client 10 may obtain voice information of a user, may be communicatively connected to a remote server, and finally presents shopping recommendation content through a display device when the client 10 is configured in an offline shopping environment.

A shopping recommendation principle according to the present disclosure will be described in detail below by way of specific examples in conjunction with the accompanying drawings.

Figure 2:
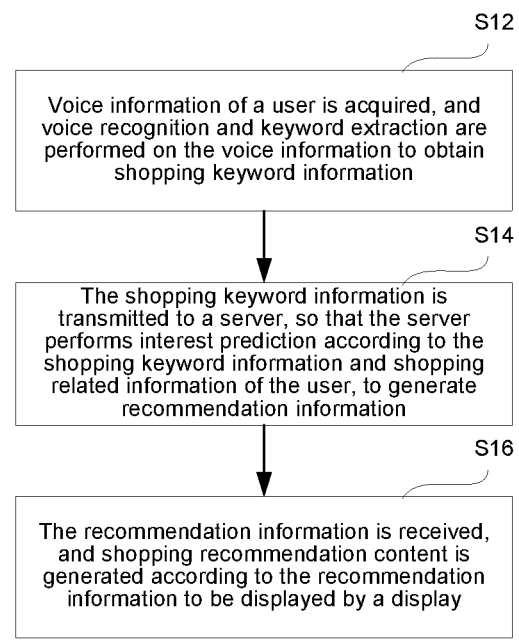
FIG. 2 is a flowchart of a shopping recommendation method applicable to a client according to an embodiment of the present disclosure.

FIG. 2 is a flowchart of a shopping recommendation method applicable to a client according to an embodiment of the present disclosure.

As shown in FIG. 2, in the present embodiment, the present disclosure provides a shopping recommendation method applicable to a client, which comprises the following steps.

In S12, voice information of a user is acquired, and voice recognition and keyword extraction are performed on the voice information to obtain shopping keyword information.

In S14, the shopping keyword information is transmitted to a server, so that the server performs interest prediction according to the shopping keyword information and shopping related information of the user, to generate recommendation information.

In S16, the recommendation information is received, and shopping recommendation content is generated according to the recommendation information to be displayed by a display.

Specifically, in the present embodiment, the client comprises a Computer Processing Unit (CPU) and a wireless communication circuit, and performs the above method in cooperation with a voice collection device and a display which are configured separately. The voice collection device and the display may be separately configured on a shopping cart. For example, a microphone and a display may be separately configured on the shopping cart. Alternatively, any intelligent mobile terminal of the user, for example, a mobile phone, an intelligent watch etc., which is in wireless communication with the client described, may be configured.

In step S12, after the voice information of the user is collected by the voice collection device, the voice collection device transmits the voice information to the client, and the client performs voice recognition on the voice information to convert the voice information into text information, and then extracts keywords from the text information to obtain shopping keyword information.

In the present embodiment, the shopping keyword information comprises commodity category information, commodity name information, and commodity rating information. In other embodiments, the shopping keyword information may also be configured as any one or more of the above information, and may further comprise other commodity related information, such as price information, competing commodity information etc.

For example, a piece of voice information of the user which is "the soy sauce in the home is almost exhausted, the taste of soy sauce A does not taste good, and the soy sauce B bought last time tastes good", is pre-processed by word segmentation, filtering, etc., and then two groups of keywords are extracted from the piece of voice information.

One group of keywords is as follows: category information: soy sauce; name information: A; and rating information: does not taste good; and the other group of keywords is as follows: category information: soy sauce; name information: B; and rating information: tastes good.

The above enumeration is only an example. In other embodiments, keyword extraction may be performed according to different keyword extraction methods commonly used in the art, and the same technical effects can be achieved.

In the present embodiment, the shopping keyword information further comprises identity information of the user. The user logs in the client by using any login method commonly used in the art, for example, by inputting an account and a password, performing code scanning, inputting a fingerprint, etc. In a process of generating the shopping keyword information by the client, the identity information of the user is configured by the client in the shopping keyword information. In another embodiment, the client may also generate user information of the user separately and transmit the user information to the server together with the shopping keyword information without configuring the identity information of the user in the shopping keyword information. In other embodiments, the client may also adopt other identification methods commonly used in the art, so that the server may identify the user after receiving the shopping keyword information.

In step S14, the client transmits the shopping keyword information, which is extracted according to the voice information of the user, to the server.

After receiving the shopping keyword information, the server acquires, according to the identity information in the shopping keyword information or the user information transmitted together with the shopping keyword information, several shopping related information, for example, basic information of the user, commodity information such as commodity name, commodity price, commodity promotions etc., shopping history information of the user, other interactive information such as commodity information collected by the user on an online platform etc., and then performs interest prediction according to the shopping keyword information and various shopping related information described above.

In the present embodiment, the interest prediction is configured as a biclassification problem, and is performed by using a deep neural network model. Performing the interest prediction specifically comprises:

the server extracting a feature vector according to the shopping keyword information and the shopping related information; inputting the feature vector to the deep neural network model for training to obtain a prediction model; then inputting the feature vector to the prediction model for prediction to obtain a prediction result; and finally generating recommendation information according to the prediction result.

Here, the prediction result comprises a purchase prediction probability (P1, P2) for each commodity, wherein P1 is a prediction probability that the user purchases the commodity, and P2 is a prediction probability that the user does not purchase the commodity, and a sum of P1 and P2 is 1. The recommendation information comprises several pieces of information of several commodities with the highest purchase prediction probability, such as name information, parameter information, discount information etc.

In an embodiment, in a model training process, a weight of the shopping keyword information may be further increased to ensure a correlation between the prediction result and the final recommendation result and the voice information.

In other embodiments, other prediction algorithms and models commonly used in the art may also be used to perform interest prediction, and the same technical effects can be achieved.

In step S16, the server transmits the recommendation information to the client, and after receiving the recommendation information, the client generates shopping recommendation content according to the recommendation information to be displayed by a display.

Here, the shopping recommendation content may be presented in various ways for example, through webpages, pictures, videos etc.

In an embodiment, the shopping recommendation content may further comprise shelf position information of a recommended commodity, wherein the shelf position information may be acquired by the server from a service backend platform in a shopping mall or supermarket when the server generates the recommendation information, or may be acquired by the client from the service backend platform in the shopping mall or supermarket when the client generates data of the shopping recommendation content.

In various embodiments described above, voice information of a user in an offline shopping scene in a shopping mall or supermarket is collected, keywords are extracted from the voice information, so that the server performs interest prediction in combination with other shopping related information, and finally shopping recommendation content is presented through a display, thereby realizing accurate and personalized recommendations for the user in the shopping scene in the shopping mall or supermarket.

In various embodiments described above, the correlation between the shopping recommendation content and the voice information is further ensured by configuring a weight of the voice keyword information in a process of performing the interest prediction, thereby improving the accuracy of the personalized recommendation; and further, the shelf position information of the recommended commodity is presented during the recommendation, which increases the purchase rate of the commodity while optimizing the user experience.

Figure 3:
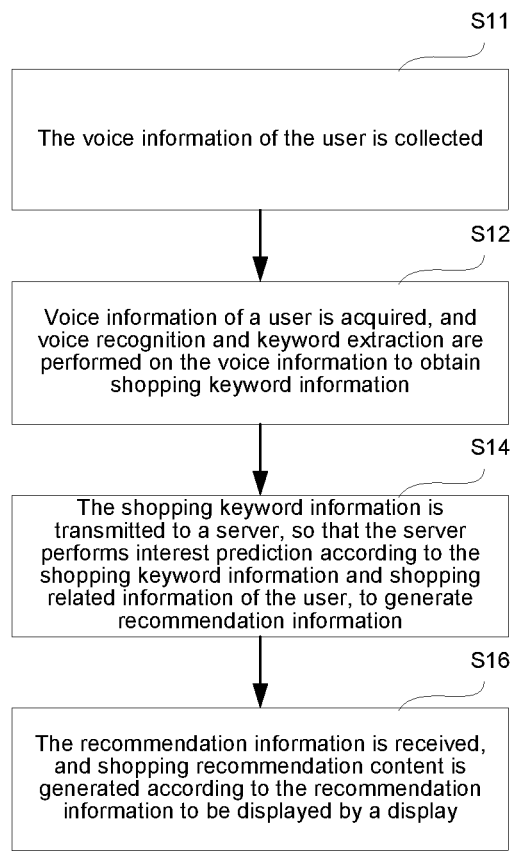
FIG. 3 is a flowchart of an implementation of the method shown in FIG. 2.

FIG. 3 is a flowchart of an implementation of the method shown in FIG. 2. As shown in FIG. 3, in an embodiment, the method described above further comprises the following step.

In S11, the voice information of the user is collected.

Specifically, the embodiment shown in FIG. 3 differs from the embodiment shown in FIG. 2 in that a collection circuit configured to collect the voice information is integrated in the client, without separately configuring a voice collection device.

Figure 4:
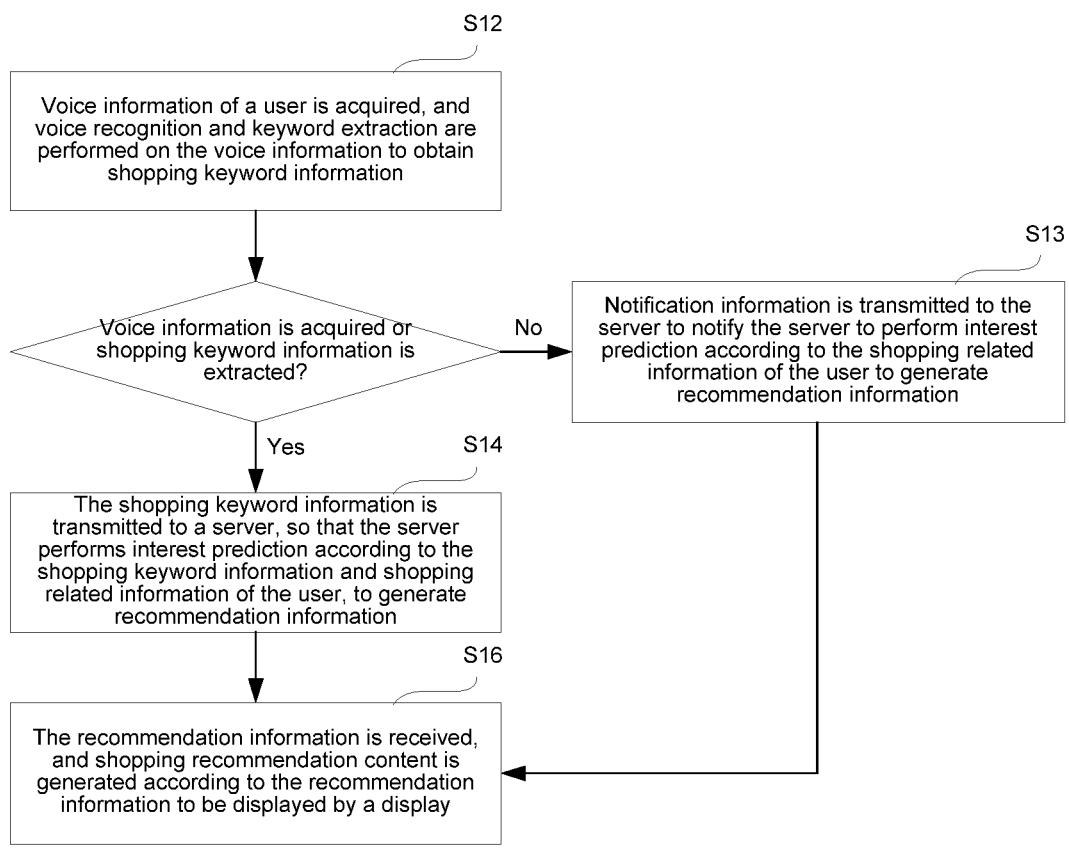
FIG. 4 is a flowchart of another implementation of the method shown in FIG. 2.

FIG. 4 is a flowchart of another implementation of the method shown in FIG. 2. As shown in FIG. 4, in an embodiment, the method described above further comprises the following step.

In S13, when no voice information is acquired or no shopping keyword information is extracted, notification information is transmitted to the server to notify the server to perform interest prediction according to the shopping related information of the user to generate recommendation information.

Specifically, the embodiment shown in FIG. 4 differs from the embodiment shown in FIG. 2 in that, in order to ensure that when no voice information is collected or no keyword is extracted from the voice information, personalized recommendation for the user can still be realized, the notification information is transmitted to the server to notify the server to perform interest prediction only according to the shopping related information of the user to generate the recommendation information.

In the embodiment described above, when no voice information is acquired or no shopping keyword information is extracted, the interest prediction is performed only according to the shopping related information, and the shopping recommendation content is presented, thereby realizing the personalized recommendation in a shopping scene in a shopping mall or supermarket.

Figure 5:
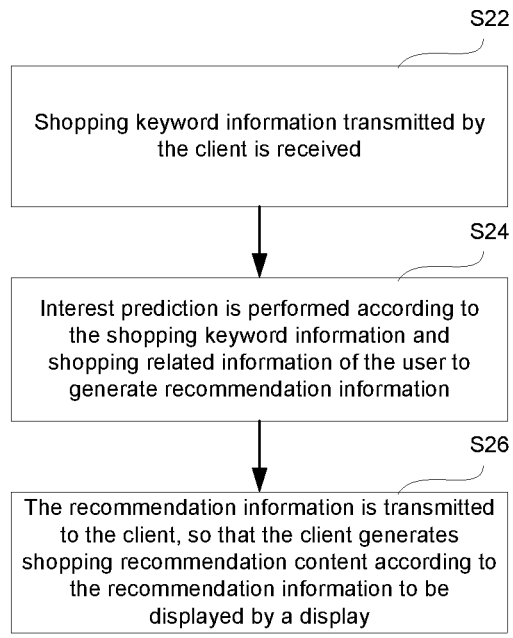
FIG. 5 is a flowchart of a shopping recommendation method applicable to a server according to an embodiment of the present disclosure.

FIG. 5 is a flowchart of a shopping recommendation method applicable to a server according to an embodiment of the present disclosure. The server which performs the method shown in FIG. 5 may perform shopping recommendation in cooperation with the client which performs the method shown in FIG. 1.

As shown in FIG. 5, in the present embodiment, the present disclosure further provides a shopping recommendation method applicable to a server, which comprises the following steps.

In S22, shopping keyword information transmitted by the client is received, wherein the shopping keyword information is obtained by acquiring voice information of a user and performing voice recognition and keyword extraction on the voice information by the client.

In S24, interest prediction is performed according to the shopping keyword information and shopping related information of the user to generate recommendation information.

In S26, the recommendation information is transmitted to the client, so that the client generates shopping recommendation content according to the recommendation information to be displayed by a display.

A shopping recommendation principle of the method shown in FIG. 5 may be known with reference to that of the method shown in FIG. 2, and details thereof will not be described here again.

Figure 6:
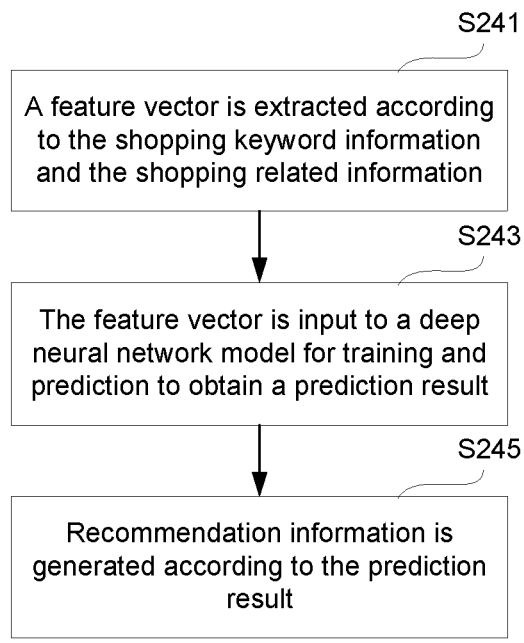
FIG. 6 is a flowchart of step S24 in an implementation of the method shown in FIG. 5.

FIG. 6 is a flowchart of step S23 in an implementation of the method shown in FIG. 5. As shown in FIG. 6, in an embodiment, the shopping keyword information comprises at least one of commodity category information, commodity name information, and commodity rating information. The shopping related information comprises at least one of basic information of the user, commodity information, shopping history information, and other interactive information.

Step S24 comprises the following steps.

In S241, a feature vector is extracted according to the shopping keyword information and the shopping related information.

In S243, the feature vector is input to a deep neural network model for training and prediction to obtain a prediction result.

In S245, recommendation information is generated according to the prediction result.

In an embodiment, step S243 further comprises: further increasing a weight of the shopping keyword information to ensure a correlation between the prediction result and the final recommendation result and the voice information.

In an embodiment, step S245 further comprises: obtaining shelf position information of a recommended commodity from a service backend platform in a shopping mall or supermarket to generate recommendation information including the shelf position information.

A interest prediction principle of the method shown in FIG. 6 may also be known with reference to that of the method shown in FIG. 2, and details thereof will not be described here again.

Figure 7:
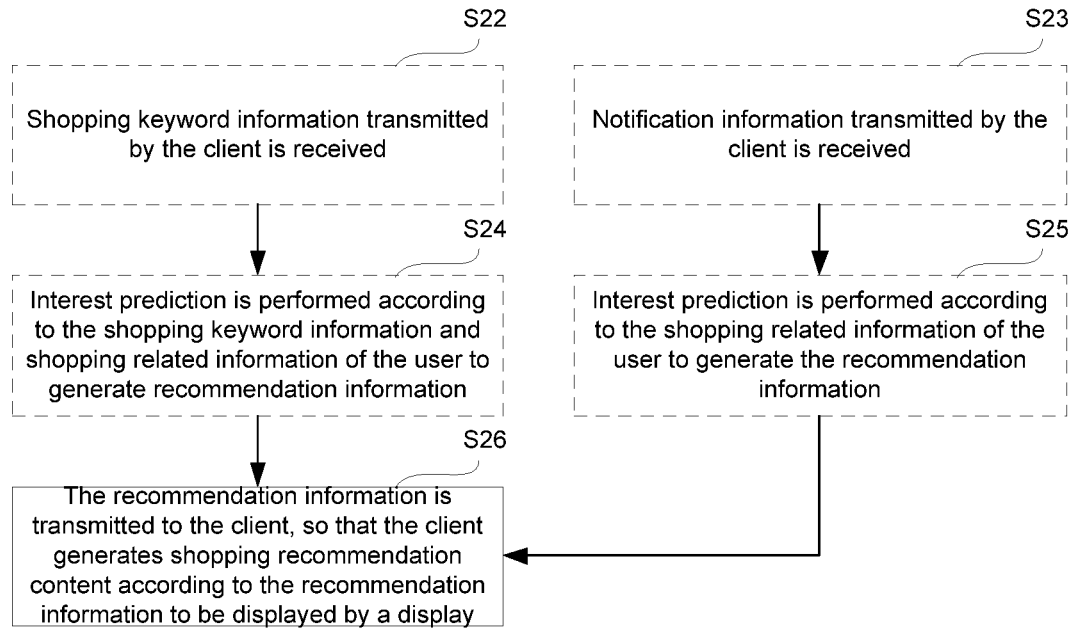
FIG. 7 is a flowchart of an implementation of the method shown in FIG. 5.

FIG. 7 is a flowchart of an implementation of the method shown in FIG. 5. A server which performs the method shown in FIG. 7 may perform shopping recommendation in cooperation with the client which performs the method shown in FIG. 4. As shown in FIG. 7, in an embodiment, the method further comprises the following steps.

In S23, notification information transmitted by the client is received, wherein the notification information is transmitted by the client when no voice information is acquired or no shopping keyword information is extracted.

In S25, after the notification information is received, interest prediction is performed according to the shopping related information of the user to generate the recommendation information.

A shopping recommendation principle of the method shown in FIG. 7 may be known with reference to that of the method shown in FIG. 4, and details thereof will not be described here again.

Figure 8:
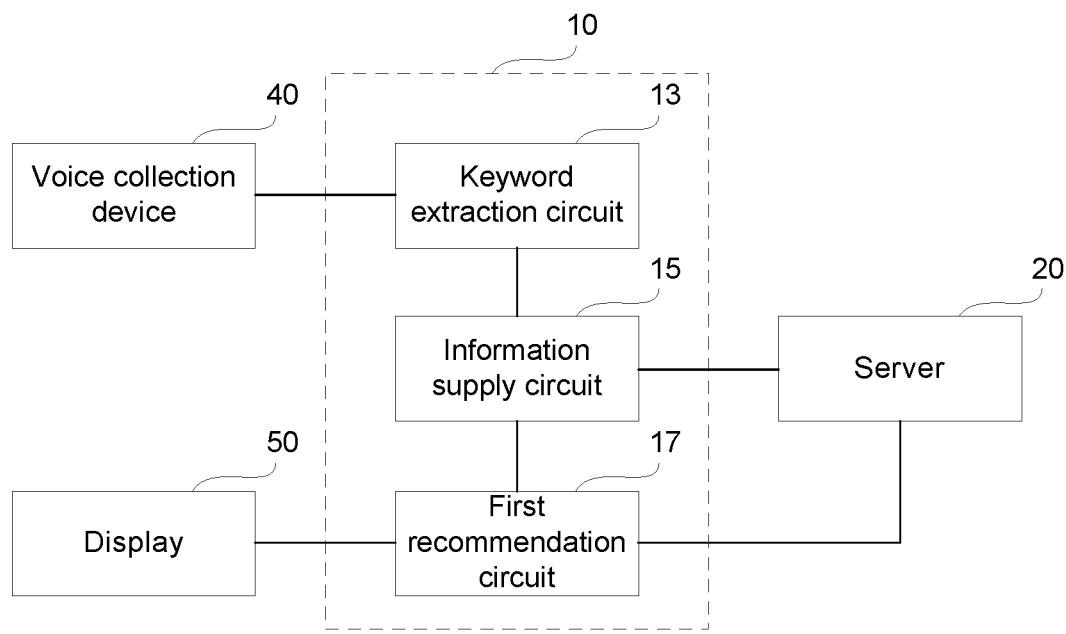
FIG. 8 is a schematic structural diagram of a client according to an embodiment of the present disclosure.

FIG. 8 is a schematic structural diagram of a client according to an embodiment of the present disclosure. The client shown in FIG. 8 may correspondingly perform the method shown in FIG. 2 or FIG. 4.

As shown in FIG. 8, in the present embodiment, the present disclosure provides a client 10, which comprises a keyword extraction circuit 13, an information supply circuit 15, and a first recommendation circuit 17.

The keyword extraction circuit 13 is configured to acquire voice information of a user collected by a voice collection device 40, and perform voice recognition and keyword extraction on the voice information to obtain shopping keyword information.

The information supply circuit 15 is configured to transmit the shopping keyword information to a server 20, so that the server 20 performs interest prediction according to the shopping keyword information and shopping related information of the user to generate recommendation information.

The first recommendation circuit 17 is configured to receive the recommendation information, and generate shopping recommendation content according to the recommendation information to be displayed by a display 50.

In the present embodiment, the client 10 comprises a central processor and a WIFI circuit. In other embodiments, a combination of different wireless communication circuits, such as other various types of microprocessors and 4G circuits etc., and the same technical effects can be achieved.

In an embodiment, the shopping keyword information comprises at least one of commodity category information, commodity name information, and commodity rating information. The shopping related information comprises at least one of basic information of the user, commodity information, shopping history information, and other interactive information.

Performing the interest prediction comprises: extracting a feature vector according to the shopping keyword information and the shopping related information; inputting the feature vector to a deep neural network model for training and prediction to obtain a prediction result; and generating recommendation information according to the prediction result.

In an embodiment, the information supply circuit 15 is further configured to transmit notification information to the server 20 when the keyword extraction circuit 13 does not acquire any voice information or does not extract any shopping keyword information, to notify the server 20 to perform interest prediction according to the shopping related information of the user to generate the recommendation information.

In an embodiment, the first recommendation circuit 17 is further configured to acquire shelf position information of a recommended commodity from a service backend platform in a shopping mall or supermarket according to the recommendation information, thereby generating shopping recommendation content including the shelf position information of the recommended commodity.

A shopping recommendation principle of the client according to various embodiments shown in FIG. 8 may be known with reference to that of the method shown in FIG. 2 or FIG. 4, and details thereof will not be described here again.

Figure 9:
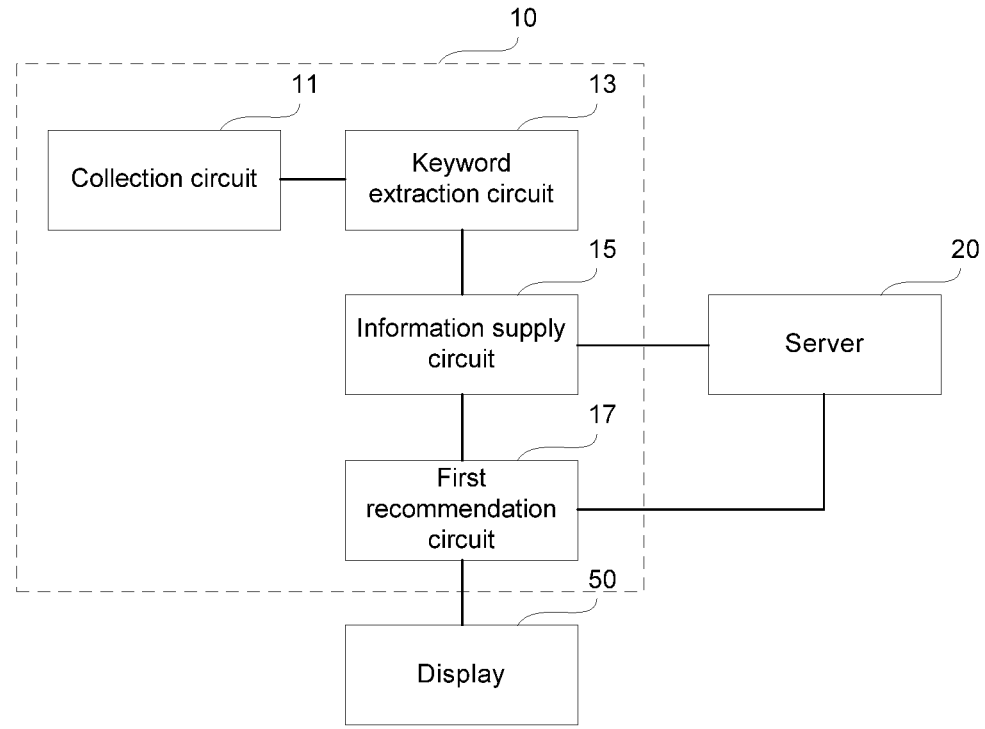
FIG. 9 is a schematic structural diagram of a client according to another embodiment of the present disclosure.

FIG. 9 is a schematic structural diagram of a client according to another embodiment of the present disclosure. The client shown in FIG. 9 may correspondingly perform the method shown in FIG. 3.

As shown in FIG. 9, compared with the client shown in FIG. 8, the client 10 shown in FIG. 9 further comprises a collection circuit 11 configured to collect the voice information of the user.

Specifically, in the present embodiment, the collection circuit 11 is configured as a microphone. In other embodiments, the collection circuit 11 may also be configured as another type of voice collection component commonly used in the art, such as a microphone array etc., and the same technical effects can be achieved.

A shopping recommendation principle of the client shown in FIG. 9 may be known with reference to that of the method shown in FIG. 3, and details thereof will not be described here again.

Figure 10:
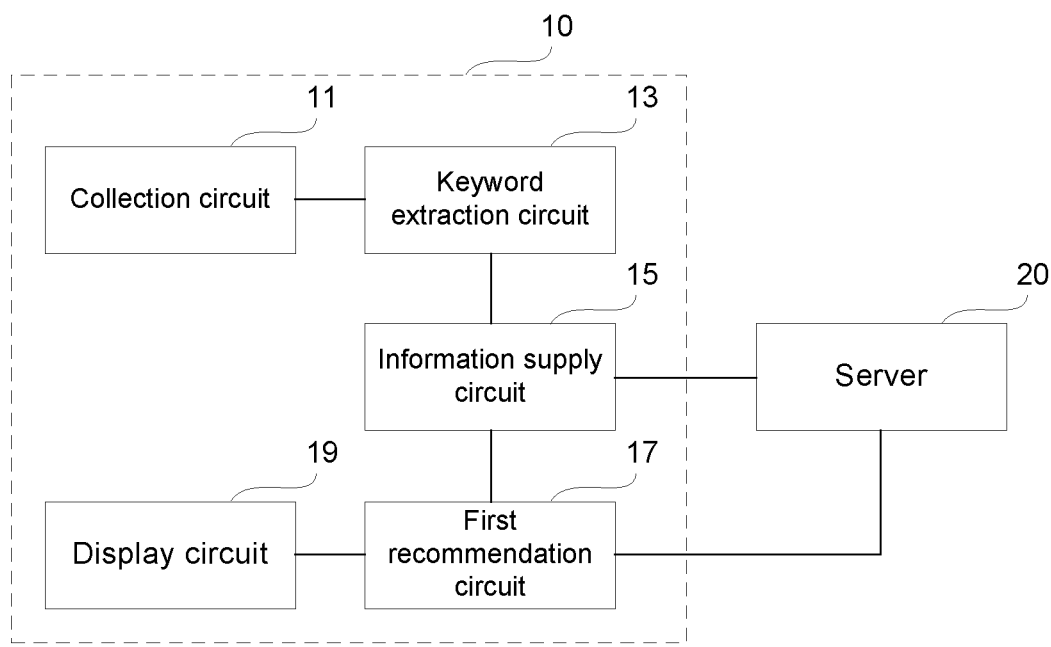
FIG. 10 is a schematic structural diagram of a client according to yet another embodiment of the present disclosure.

FIG. 10 is a schematic structural diagram of a client according to yet another embodiment of the present disclosure. The client shown in FIG. 10 may also perform the method shown in FIG. 3.

As shown in FIG. 10, compared with the client shown in FIG. 9, the client 10 shown in FIG. 10 further comprises a display circuit configured to display the shopping recommendation content.

The client shown in FIG. 10 differs from the client shown in FIG. 9 in that the display circuit 19 is integrated therein.

Figure 11:
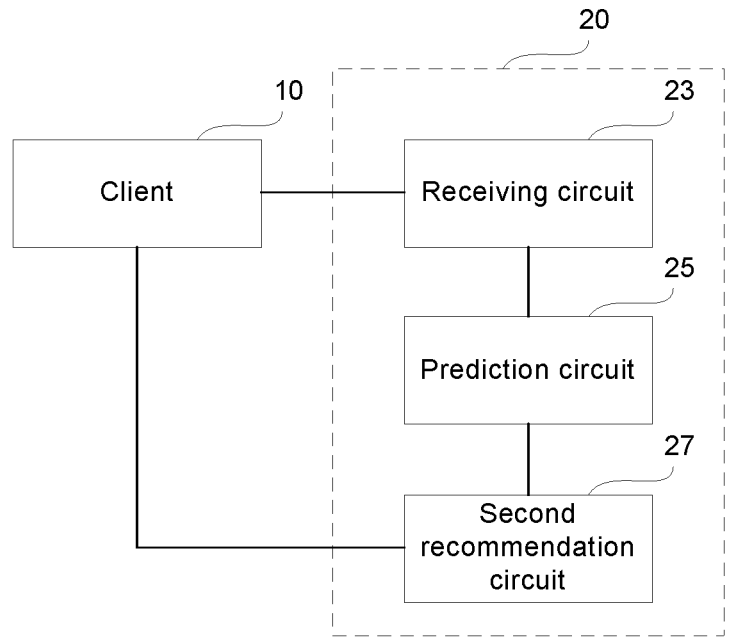
FIG. 11 is a schematic structural diagram of a server according to an embodiment of the present disclosure.

FIG. 11 is a schematic structural diagram of a server according to an embodiment of the present disclosure. The server shown in FIG. 11 may perform the method shown in FIG. 5 or FIG. 7.

As shown in FIG. 11, in the present embodiment, the present disclosure provides a server 20, which comprises a receiving circuit 23, a prediction circuit 25, and a second recommendation circuit 27.

The receiving circuit 23 is configured to receive shopping keyword information transmitted by the client 10. The shopping keyword information is obtained by acquiring, by the client 10, voice information of a user, and performing voice recognition and keyword extraction on the voice information.

The prediction circuit 25 is configured to perform interest prediction according to the shopping keyword information and the shopping related information of the user to generate recommendation information.

The second recommendation circuit 27 is configured to transmit the recommendation information to the client 10, so that the client 10 generates shopping recommendation content according to the recommendation information to be displayed by a display.

In an embodiment, the receiving circuit 23 is further configured to receive notification information transmitted by the client 10, wherein the notification information is transmitted by the client 10 when no voice information is acquired or no shopping keyword information is extracted.

The prediction circuit 25 is further configured to, after the receiving circuit 23 receives the notification information, perform interest prediction according to the shopping related information of the user to generate recommendation information.

A shopping recommendation principle of the server shown in FIG. 11 may be known with reference to that of the method shown in FIG. 5 or FIG. 7, and details thereof will not be described here again.

Figure 12:
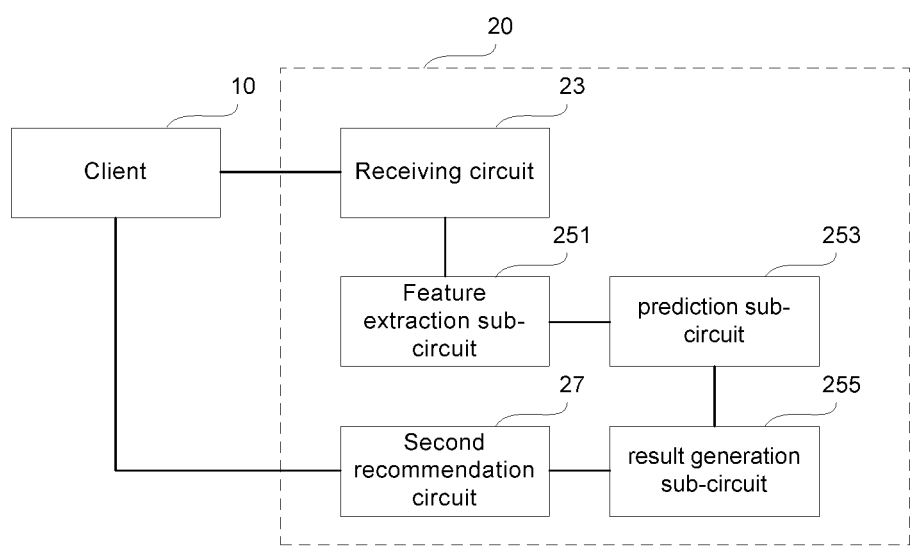
FIG. 12 is a schematic structural diagram of an implementation of the server shown in FIG. 11.

FIG. 12 is a schematic structural diagram of an implementation of the server shown in FIG. 11. The server shown in FIG. 12 may perform the method shown in FIG. 6.

As shown in FIG. 12, in an embodiment, the prediction circuit 25 comprises a feature extraction sub-circuit 251, a prediction sub-circuit 253, and a result generation sub-circuit 255.

The feature extraction sub-circuit 251 is configured to extract a feature vector according to the shopping keyword information and the shopping related information.

The prediction sub-circuit 253 is configured to input the feature vector to a deep neural network model for training and prediction to obtain a prediction result.

The result generation sub-circuit 255 is configured to generate recommendation information according to the prediction result.

In an embodiment, the prediction sub-circuit 253 is further configured to increase a weight of the shopping keyword information to ensure a correlation between the prediction result and the final recommendation result and the voice information.

In an embodiment, the result generation sub-circuit 255 is further configured to acquire shelf position information for a recommended commodity from a service backend platform in a shopping mall or supermarket to generate recommendation information including the shelf position information.

A shopping recommendation principle of the server shown in FIG. 12 may be known with reference to that of the method shown in FIG. 6, and details thereof will not be described here again.

Figure 13:
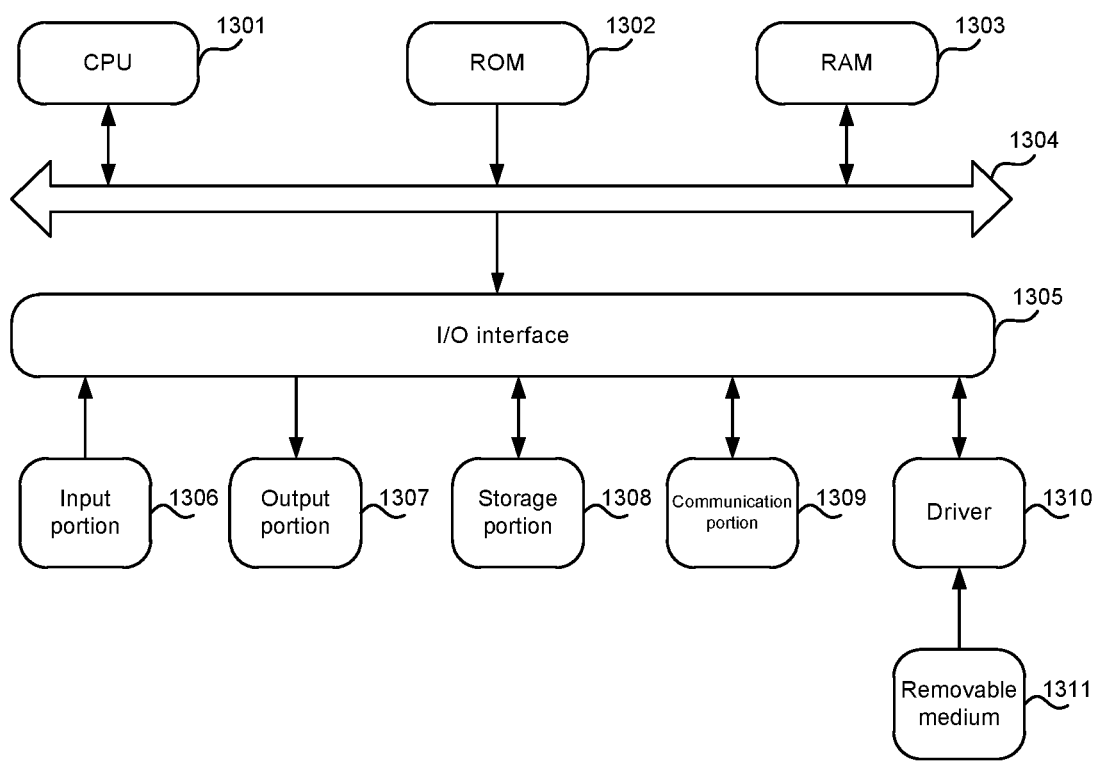
FIG. 13 is a schematic structural diagram of a shopping recommendation device according to an embodiment of the present disclosure.

FIG. 13 is a schematic structural diagram of a shopping recommendation device according to an embodiment of the present disclosure.

As shown in FIG. 13, in another aspect, the present disclosure further provides a device 1300 comprising one or more CPUs 1301 which may perform various suitable actions and processes according to programs stored in a Read Only Memory (ROM) 1302 or programs loaded from a storage portion 1308 into a Random Access Memory (RAM) 1303. Various programs and data required for operations of the device 1300 are also stored in the RAM 1303. The CPU 1301, the ROM 1302, and the RAM 1303 are connected to each other through a bus 1304. An Input/Output (I/O) interface 1305 is also connected to the bus 1304.

The following components are connected to the I/O interface 1305: an input portion 1306 comprising a keyboard, a mouse, etc.; an output portion 1307 comprising a Cathode Ray Tube (CRT), a Liquid Crystal Display (LCD) etc., and a speaker etc.; a storage portion 1308 comprising a hard disk etc.; and a communication portion 1309 comprising a network interface card such as a Local Area Network (LAN) card, a modem, etc. The communication portion 1309 performs communication processing via a network such as the Internet. A driver 1310 is also connected to the I/O interface 1305 as needed. A removable medium 1311 such as a magnetic disk, an optical disk, a magneto-optical disk, a semiconductor memory etc. is mounted on the driver 1310 as needed, so that a computer program read therefrom is installed into the storage portion 1308 as needed.

In particular, according to an embodiment of the present disclosure, the shopping recommendation method described in any of the above embodiments may be implemented as a computer software program. For example, an embodiment of the present disclosure comprises a computer program product, comprising a computer program tangibly embodied on a machine readable medium, wherein the computer program comprises program codes for executing a shopping recommendation method. In such an embodiment, the computer program may be downloaded and installed from a network via the communication portion 1309, and/or installed from the removable medium 1311.

In still another aspect, the present disclosure further provides a computer readable storage medium, which may be a computer readable storage medium included in the device according to the embodiments described above; or may also be a computer readable storage medium which exists separately and is not assembled in the device. The computer readable storage medium has one or more programs stored thereon, which are used by one or more processors to perform the shopping recommendation method described in the present disclosure.

In the shopping recommendation method, the client, the server, the device, and the storage medium according to various embodiments of the present disclosure, voice information of a user in an offline shopping scene in a shopping mall or supermarket is collected, keywords are extracted from the voice information, so that the server performs interest prediction in combination with other shopping related information, and finally shopping recommendation content is presented through a display, thereby realizing accurate and personalized recommendations for the user in the shopping scene in the shopping mall or supermarket.

In the shopping recommendation method, the client, the server, the device, and the storage medium according to some embodiments of the present disclosure, when no voice information is acquired or no shopping keyword information is extracted, the interest prediction is performed only according to the shopping related information, and the shopping recommendation content is presented, thereby realizing the personalized recommendation in a shopping scene in a shopping mall or supermarket.

In the shopping recommendation method, the client, the server, the device, and the storage medium according to some embodiments of the present disclosure, the correlation between the shopping recommendation content and the voice information is further ensured by configuring a weight of the voice keyword information in a process of performing the interest prediction, thereby improving the accuracy of the personalized recommendation.

In the shopping recommendation method, the client, the server, the device, and the storage medium according to some embodiments of the present disclosure, the shelf position information of the recommended commodity is presented during the recommendation, which increases the purchase rate of the commodity while optimizing the user experience.

The flowcharts and block diagrams in the accompanying drawings illustrate architecture, functions, and operations of possible implementations of systems, methods, and computer program products according to various embodiments of the present disclosure. In this regard, each block of the flowcharts or block diagrams can represent a module, a program segment, or a portion of codes, which comprises one or more executable instructions for implementing specified logical functions. It should also be illustrated that in some alternative implementations, the functions noted in the block may also occur in a different order than that illustrated in the accompanying drawings. For example, two successively represented blocks may in fact be executed substantially in parallel, and they may sometimes be executed in a reverse order, depending upon the functionality involved. It should also be illustrated that each block of the block diagrams and/or flowcharts, and combinations of blocks in the block diagrams and/or flowcharts, can be implemented in a dedicated hardware-based system which performs the specified functions or operations, or can be implemented by a combination of dedicated hardware and computer instructions.

Units or modules described in the embodiments of the present disclosure may be implemented by software or by hardware. The units or modules described may also be provided in a processor. For example, each of the units may be a software program provided in a computer or a mobile intelligent device, or may also be a hardware device which is separately configured. Here, names of these units or modules do not constitute a limitation on the units or modules themselves in any way.

The above description is only embodiments of the present disclosure and a description of the principles of the applied technology. It should be understood by those skilled in the art that the scope of the present disclosure is not limited to the technical solutions formed by a specific combination of the above technical features, and should also encompass other technical solutions formed by any combination of the above technical features or equivalent features, for example, technical solutions formed by replacements of the above features by, but not limited to, technical features having similar functions to those disclosed by the present disclosure.

We claim:

1. A shopping recommendation method, comprising:
    operating a client device in an offline shopping scene, the client device associated with a user;
    determining whether voice information has been acquired and whether shopping keyword information has been extracted by the client device;
    in response to determining that no voice information has been acquired or that no shopping keyword information has been extracted by the client device:
        transmitting, by the client device to a server, notification information to cause the server to perform a first interest prediction based only on shopping related information of the user; and
        receiving, by the client device from the server, first recommendation information generated based on the first interest prediction;
    collecting conversational voice information of the user by a voice collection device associated with the client device;
    performing voice recognition and shopping keyword extraction by a client processing device associated with the client device on the collected conversational voice information;
    in response to determining that conversational voice information has been acquired and that shopping keyword information has been extracted:
        transmitting, by the client device to the server, the shopping keyword information to cause the server to perform a second interest prediction based on the shopping keyword information and shopping related information of the user; and
        receiving second recommendation information by the client device generated by the server based on the second interest prediction, the second recommendation information to be displayed by a display associated with the client device,
    wherein at least the voice collection device and the display are configured on a shopping cart or a shopping basket in the offline shopping scene; and
    wherein causing the server to perform the second interest prediction includes causing the server to:
        extract a feature vector according to the shopping keyword information and the shopping related information;
        input the feature vector to a deep neural network model for training and prediction to obtain a prediction result; and
        generate the second recommendation information according to the prediction result.

2. The method according to claim 1, wherein:
    the shopping keyword information comprises at least one of commodity category information, commodity name information, and commodity rating information; and
    the shopping related information comprises at least one of basic information of the user, commodity information, shopping history information, and other interactive information.

3. A shopping recommendation method, comprising:
    receiving, by a server, shopping keyword information transmitted by a communication device of a client, wherein the shopping keyword information is obtained by collecting conversational voice information of a user by a voice collection device in an offline shopping scene in a shopping mall or supermarket and performing voice recognition and keyword extraction on the voice information by a processing device of the client;
    performing interest prediction, by the server, according to the shopping keyword information and shopping related information of the user to generate recommendation information; and
    transmitting the recommendation information to the client, by the server, to the communication device of the client, so that the client generates shopping recommendation content according to the recommendation information to be displayed by a display,
    wherein at least the voice collection device and the display are configured on a shopping cart or a shopping basket in the shopping mall or supermarket;
    wherein performing interest prediction, by the server, according to the shopping keyword information and shopping related information of the user to generate recommendation information comprises:
        extracting a feature vector according to the shopping keyword information and the shopping related information;
        inputting the feature vector to a deep neural network model for training and prediction to obtain a prediction result; and
        generating the recommendation information according to the prediction result; and
    wherein the method further comprises:
        receiving notification information transmitted by the client, wherein the notification information is transmitted by the client in response to no conversational voice information being acquired or no shopping keyword information being extracted; and after receiving the notification information, performing interest prediction according to the shopping related information of the user, to generate the recommendation information.

4. The method according to claim 3, wherein:
the shopping keyword information comprises at least one of commodity category information, commodity name information, and commodity rating information; and
the shopping related information comprises at least one of basic information of the user, commodity information, shopping history information, and other interactive information.

5. A client device, comprising:
one or more processors;
a communication device;
a voice collection device; and
a memory connected to the one or more processors and having one or more programs stored therein, which, when executed by the one or more processors, cause the one or more processors, the communication device and the voice collection device to be configured to:
  operate the client device in an offline shopping scene, the client device associated with a user;
  determine whether voice information has been acquired and whether shopping keyword information has been extracted by the client device;
  in response to determining that no voice information has been acquired or that no shopping keyword information has been extracted by the client device:
    transmit, by the communication device to a server, notification information to cause the server to perform a first interest prediction based only on shopping related information of the user; and
    receive, by the communication device from the server, first recommendation information generated based on the first interest prediction;
  collect conversational voice information of the user by the voice collection device;
  perform voice recognition and shopping keyword extraction on the collected conversational voice information by the one or more processors;
  in response to determining that conversational voice information has been acquired and shopping keyword information has been extracted:
    transmit the shopping keyword information by the communication device to the server, to cause the server to perform a second interest prediction based on the shopping keyword information and shopping related information of the user; and
    receive second recommendation information by the communication device generated by the server based on the second interest prediction, the second recommendation information to be displayed by a display associated with the client device,
  wherein at least the voice collection device and the display are configured on a shopping cart or a shopping basket in the offline shopping scene; and
  wherein causing the server to perform the second interest prediction includes causing the server to:
    extract a feature vector according to the shopping keyword information and the shopping related information;
    input the feature vector to a deep neural network model for training and prediction to obtain a prediction result; and
    generate the second recommendation information according to the prediction result.

6. The client device according to claim 5, wherein:
the shopping keyword information comprises at least one of commodity category information, commodity name information, and commodity rating information; and
the shopping related information comprises at least one of basic information of the user, commodity information, shopping history information, and other interactive information.

7. A server, comprising:
one or more processors; and
a memory connected to the one or more processors and having one or more programs stored therein, which, when executed by the one or more processors, cause the one or more processors to be configured to:
  receive shopping keyword information transmitted by a communication device of a client, wherein the shopping keyword information is obtained by collecting conversational voice information of a user by a voice collection device in an offline shopping scene in a shopping mall or supermarket and performing voice recognition and keyword extraction on the voice information by a processing device of the client;
  perform interest prediction according to the shopping keyword information and shopping related information of the user to generate recommendation information; and
  transmit the recommendation information to the communication device of the client, so that the client generates shopping recommendation content according to the recommendation information to be displayed by a display,
  wherein, at least the voice collection device and the display are configured on a shopping cart or a shopping basket in the shopping mall or supermarket,
wherein the one or more programs, when executed by the one or more processors, further cause the one or more processors to be configured to:
  extract a feature vector according to the shopping keyword information and the shopping related information;
  input the feature vector to a deep neural network model for training and prediction to obtain a prediction result; and
  generate the recommendation information according to the prediction result,
wherein the one or more programs, when executed by the one or more processors, further cause the one or more processors to be configured to:
  receive notification information transmitted by the client, wherein the notification information is transmitted by the client in response to no voice information being acquired or no shopping keyword information being extracted; and
  after receiving the notification information, perform interest prediction according to the shopping related information of the user, to generate the recommendation information.

8. The server according to claim 7, wherein:
the shopping keyword information comprises at least one of commodity category information, commodity name information, and commodity rating information; and
the shopping related information comprises at least one of basic information of the user, commodity information, shopping history information, and other interactive information.

* * * * *